United States Patent

[11] 3,525,315

| [72] | Inventor | Karl Lange<br>Kreis Hildesheim, Germany |
|---|---|---|
| [21] | Appl. No. | 694,250 |
| [22] | Filed | Dec. 28, 1967 |
| [45] | Patented | Aug. 25, 1970 |
| [73] | Assignee | Hans Lange<br>Gross Ilde, Germany |
| [32] | Priority | Jan. 4, 1967 |
| [33] | | Germany |
| [31] | | L 55,432 |

[54] ANIMAL FEEDING APPARATUS
20 Claims, 7 Drawing Figs.

[52] U.S. Cl. .................................... 119/71, 119/51.5
[51] Int. Cl. ..................................... A01k 9/00
[50] Field of Search ........................... 119/71, 51.5, 51.11; 177/60

[56] References Cited
UNITED STATES PATENTS

| 1,967,424 | 7/1934 | Nevitt .................... | 177/60X |
| 3,037,481 | 6/1962 | Kloss ..................... | 119/71 |
| 3,295,838 | 1/1967 | Ban ....................... | 119/51.5UX |
| 3,331,357 | 7/1967 | Legrain et al. ........... | 119/71 |
| 3,425,398 | 2/1969 | Buffy et al. ............. | 119/51.11 |

*Primary Examiner*— Hugh R. Chamblee
*Attorney*— Michael S. Striker

ABSTRACT: Automatic animal feeding apparatus having a mixing tank suspended at one end of a balance beam and movable between upper and lower end positions to receive water and dried milk or other flowable solid feed when in upper end position and to move to lower end position when the weight of its contents rises to a predetermined value. The tank is connected with hoses having nipples through which the animals can suck a dispersion or a solution of feed in water. The means for supplying solid feed to the tank includes a cylinder containing a supply of feed and extending with its open lower end into a receptacle provided with a rotary agitating wheel. The bottom wall of the receptacle has an opening which discharges a stream of feed by gravity into the tank in response to rotation of the wheel. A starter switch which is actuated by the balance beam starts the motor for the agitating wheel simultaneously with opening of a valve which admits water and simultaneously with starting of a mixer which stirs the contents of the tank when the latter moves to upper end position. A bistable switchover device is associated with the balance beam to effect abrupt movements of the tank between upper and lower positions when the weight of the tank's contents respectively reaches a predetermined maximum and a predetermined minimum value.

Patented Aug. 25, 1970

INVENTOR
KARL LANGE

BY his ATTORNEY

Patented Aug. 25, 1970

INVENTOR
KARL LANGE

BY

*Michael S. Striker* his ATTORNEY

ANIMAL FEEDING APPARATUS

BACKGROUND OF THE INVENTION

The present invention relates to improvements in animal feeding apparatus, particularly to improvements in automatic apparatus for feeding liquids to mammalia.

It is already known to provide an animal feeding apparatus with a funnel which supplies feed to a first conveyor screw and is provided with an agitator coupled to the first screw. The latter supplies feed to a turntable whence the feed reaches a second conveyor screw. This second screw supplies feed to a container mounted on a weighing device. A serious drawback of such apparatus is that they can be used solely for transportation of readily flowing materials and that their operation is affected by changes in the pressure of conveyed material. Moreover, the turntable is likely to become clogged and to interrupt the transport of feed to the container, and the second conveyor screw must be driven at a relatively low speed to prevent excessive comminution of feed by an associated agitator. This results in unsatisfactory mixing of feed with liquid in the container. The feed is likely to cake on the second conveyor screw when the apparatus is at a standstill.

SUMMARY OF THE INVENTION

It is an object of my invention to provide a relatively simple, compact and reliable automatic animal feeding apparatus which is not likely to be clogged with flowable materials and which is capable of automatically replenishing the supply of feed at regular or irregular intervals, depending on the rate of consumption of prepared feed by one or more animals.

Another object of the invention is to provide the apparatus with a novel assembly of parts which supply solid flowable feed to a mixing station where the feed is mixed with liquid prior to withdrawal by animals through the intermediary of nipples or the like.

A further object of the invention is to provide an apparatus which can feed one or more animals at a time and wherein the mixing action is carried out at a constant rate irrespective of fluctuations in the supply of flowable solid feed in the apparatus.

An additional object of the invention is to provide a novel and improved weighing device for the mixing container of the above outlined animal feeding apparatus.

Still another object of the invention is to provide the apparatus with automatic agitating, feed conveying, liquid admitting and mixing units which can be operated in synchronism and only during such intervals when it becomes necessary to replenish the supply of prepared feed for consumption by the animals.

The improved animal feeding apparatus is particularly suited to form a solution or dispersion of solid feed (e.g., dried milk) in a liquid medium (e.g., in warm water) for withdrawal by calves, young pigs, deer, elks, and other mammalia. The apparatus comprises a cylinder, a funnel or an analogous source of flowable solid feed which has an open lower end, a receptacle positioned to receive feed from the lower end of the source and having a wall (preferably its bottom wall) provided with at least one discharge opening, a paddle wheel or analogous agitating means provided in the receptacle and operative to agitate feed received from the source and to cause a stream of such feed to flow through the discharge opening, a mixing container or tank located below the discharge opening to intercept the stream of feed issuing from the receptacle, a weighing device supporting the tank for movement between upper and lower end positions, and liquid admitting means operative to admit to the tank liquid at least when the tank assumes its upper end position. A starter member (e.g., an electric switch) may be employed to start the agitating means and the admission of liquid into the tank when the latter moves to its upper end position and to simultaneously start a mixer which stirs the contents of the tank during admission of liquid and feed. The resulting solution or dispersion of feed in liquid can be sucked through one or more nipples secured to the housing of the apparatus and connected by hoses to outlets provided in the lower portion of the tank. When the supply of material in the tank decreases to a predetermined level, the tank moves upwardly and receives fresh amounts of liquid and feed.

The novel features which are considered as characteristic of the invention are set forth in particular in the appended claims. The improved feeding apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
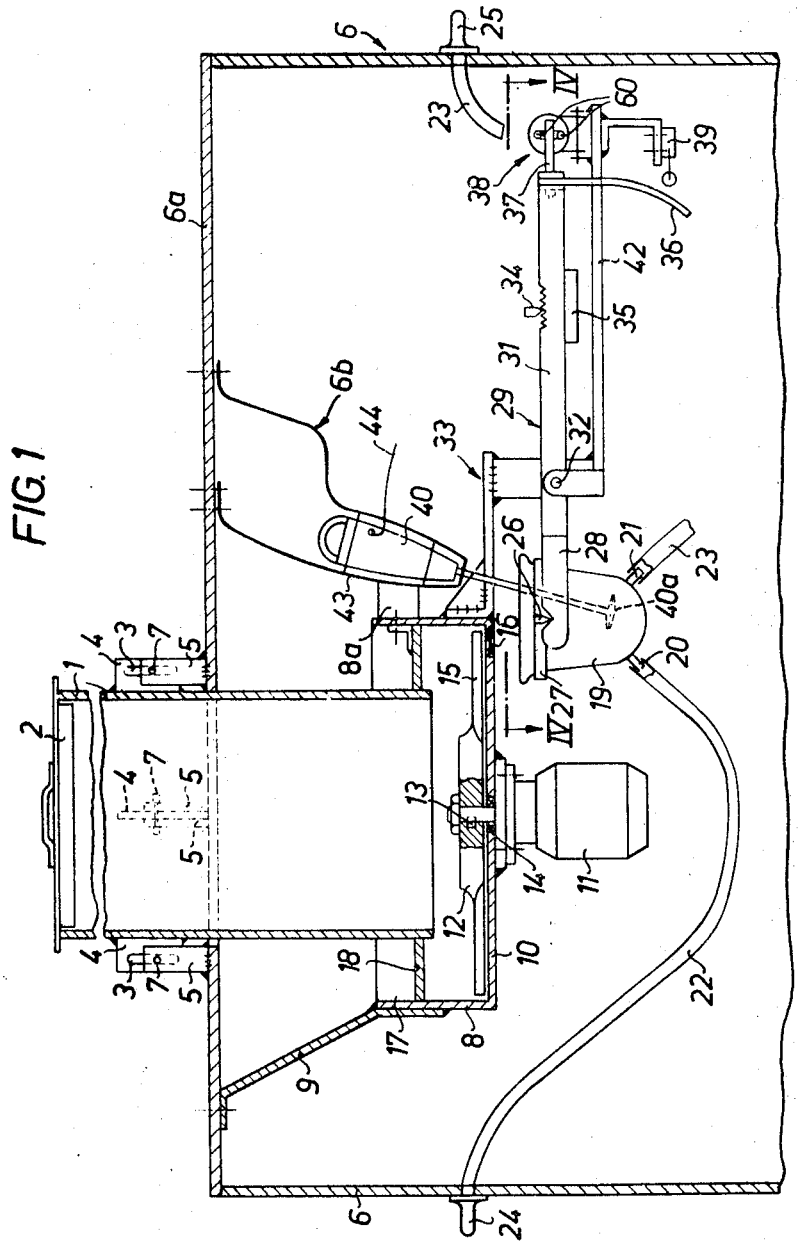
FIG. 1 is a fragmentary central vertical sectional view of an animal feeding apparatus which embodies one form of my invention.

Referring first to FIG. 1, there is shown an animal feeding apparatus which comprises a rechargeable source 1 of animal feed, e.g., dried milk. The source 1 resembles an upright cylinder and its upper end can be closed by a suitable cover 2. Four equidistant radially extending projections or lugs 4 of the cylinder 1 are formed with elongated vertical slots 3 for the stems of locking bolts 7 carried by pairs of upwardly extending brackets 5 welded to the top wall 6a of a housing 6 which is supported on the ground. By first loosening and thereupon tightening the bolts 7, the operator can select the position of the cylinder 1 with reference to the housing 6. The maximum extent of vertical adjustment of the cylinder 1 is determined by the length of slots 3. Other types of adjusting and locking means can be employed with equal advantage. The internal surface of the cylinder 1 is preferably smooth to prevent adherence of feed. For storage of certain types of feed, the cylinder 1 can be replaced with a differently configurated source, for example, with a conical container which tapers downwardly.

The lower end of the cylinder 1 is open and extends into the interior of a coaxial cylindrical dispensing receptacle 8 to the extent determined by the position of locking bolts 7 with reference to the slots 3. The receptacle 8 is secured to the top wall 6a by means of preferably four equidistant brackets or arms 9. The bottom wall 10 of the receptacle 8 supports a prime mover 11, preferably an electric motor which drives an agitating wheel 12 having blades or paddles 15 extending close to the internal surface of the cylindrical side wall of the receptacle 8. The wheel 12 is accommodated in the receptacle 8 directly above the bottom wall 10 and the output shaft 13 of the motor 11 extends through an annular gasket 14 in the bottom wall 10, the latter being provided with one or more discharge openings 16 through which the feed flows by gravity when the motor 11 drives the wheel 12.

As shown in FIG. 1, the internal diameter of the receptacle 8 exceeds the external diameter of the cylinder 1 so that these parts define between themselves an annular space 17 which receives feed from the open lower end of the cylinder when the wheel 12 rotates. To prevent overflowing of feed from the receptacle 8, the apparatus preferably comprises an annular closure member or lid 18 which can be adjustably secured to the side wall of the receptacle 8 and/or to the lower portion of the cylinder 1. In the illustrated embodiment, the closure member 18 is adjustably affixed to the side wall of the receptacle 8.

When the apparatus is in use, the annular space 17 is normally filled with feed and the pressure to which the feed is subjected in this space is substantially independent of the height of the column of feed in the cylinder 1, i.e., such pressure is more or less constant. Therefore, the rate at which the blades 15 of the wheel 12 cause the feed to issue from the discharge opening or openings 16 is also constant. Such rate can be regulated in a manner to be described in connection with FIG. 3.

The material issuing from the opening or openings 16 enters one or more mixing containers or tanks 19. For the sake of simplicity, the apparatus of FIG. 1 is assumed to have a receptacle 8 with a single discharge opening 16 which feeds material to a single mixing tank 19. The top of the tank 19 is open and its bottom region is provided with two outlets 20, 21 respectively connected to flexible supply conduits or hoses 22, 23. These hoses are connected with nipples or mammillae 24, 25 mounted externally on the side wall of the housing 6. The nipples 24, 25 are preferably mounted at a level above the open top of the tank 19, regardless of the position of this tank. The latter carries a ring 27 located closely below its open top and provided with two downwardly extending knife edges 26 extending into notches machined into the arms of a yoke 28 best shown in FIG. 4. The yoke 28 forms one end portion of a balance beam 29 which forms part of a weighing device and preferably comprises two parallel bars 30, 31 in order to insure the stability of the weighing device. The bars 30, 31 are turnable about a fulcrum constituted by a horizontal pin 32 which is supported by a holder 33 welded to a stationary part of the apparatus, for example, to the side wall of the receptacle 8 (see FIG. 1). The upper edge faces of the bars 30, 31 are provided with serrations for properly locating the crosshead 34 of a counterweight 35. The latter can be adjusted longitudinally of the balance beam 29 by placing the edge of the crosshead 34 into a selected pair of serrations. The right-hand end portion of the balance beam 29 carries an elastic actuating member or trip 36 for an electric starter switch 39 and a second actuating member or post 37 for a bistable switchover device 38. The switch 39 serves to start the motor 11 for the agitating wheel 12, to start the motor of a mixer 40 which has a rotary mixing element 40a extending into the interior of the tank 19, and to open an electromagnetic valve 41 in a supply pipe 63 (see FIG. 6) serving to admit liquid into the tank 19. The position of the starter switch 39 with reference to the trip 36 is preferably adjustable so that the operator can select the exact moment when the switch 39 closes to start the delivery of liquid and feed into the tank 19 and to start the mixer 40. For example, the switch 39 may be bolted to an arm 42 of the holder 33 for the fulcrum means 32 of the weighing device, and the arm 42 can be provided with elongated slots to take bolts meshing with the casing of the switch 39. The arm 42 further supports the switchover device 38. In order to enhance the stability of parts 38 and 39, the arm 42 can be connected to the holder 33 and also to the side wall of the housing 6. The connection between the housing 6 and arm 42 is optional and is not shown in the drawing. Of course, it also suffices to mount the arm 42 or a like support for the parts 38, 39 solely on the housing 6.

Figure 5:
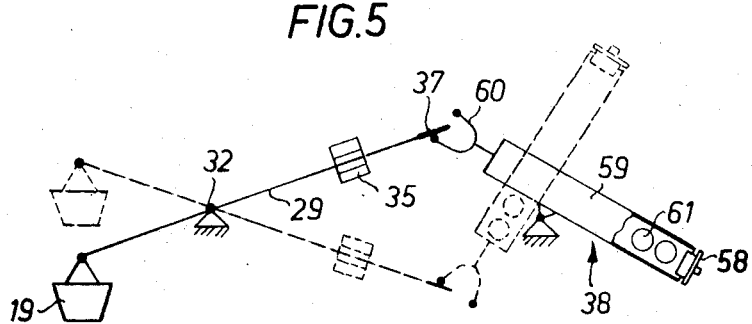
FIG. 5 is a diagrammatic view of the mixing tank in two end positions.

FIG. 1 illustrates the balance beam 29 and switchover device 38 in substantially horizontal positions but solely for the sake of simplicity. Such horizontal positions are not necessarily the normal positions of these parts, the normal positions being shown in FIG. 5.

The mixer 40 is of conventional design and its construction forms no part of the present invention. Mixers available for use in households can be employed to stir the feed in the liquid admitted by the pipe 63. The mixer 40 is suspended in a cage 43 supported by the top wall 6a of the housing 6 (by means of a bracket cage 6b) and/or directly on the side wall of the receptacle 8, as at 8a. The latter mounting is often preferred because it allows for more rapid and more convenient adjustments in the position of the mixer 40. The numeral 44 denotes electric conductors which connect the motor of the mixer 40 with the starter switch 39.

Figure 2:
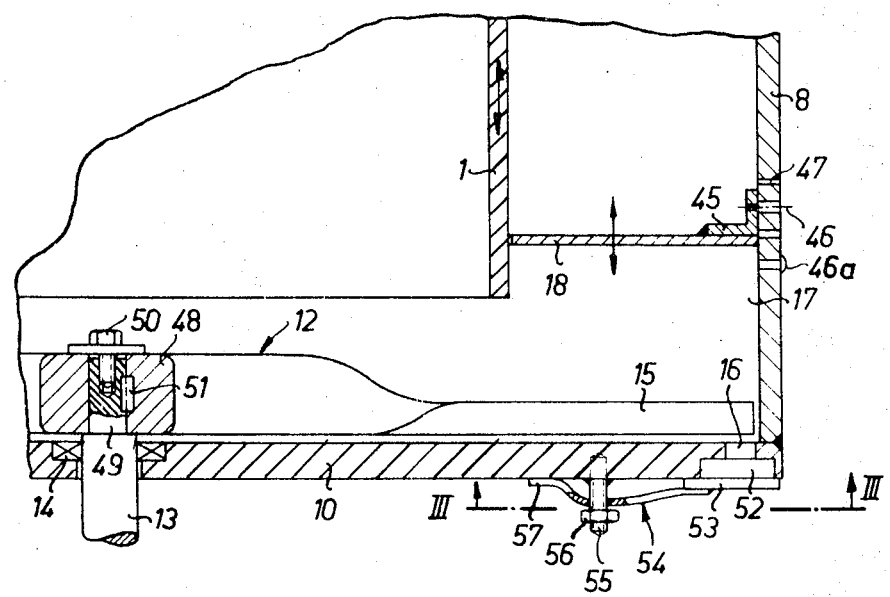
FIG. 2 is an enlarged view of a detail in the structure of FIG. 1.

FIG. 2 illustrates one mode of adjusting the position of the closure member 18 with reference to the side wall of the receptacle 8. The adjusting means comprises four equidistant L-shaped brackets 45 each having one leg welded to the closure member 18 and the other leg adjacent to the internal surface of the receptacle 8. The latter is formed with several sets of vertically spaced horizontal bores 47 for pins 46 which can connect the brackets 45 to the receptacle so that the closure member 18 is located at a desired level, depending on the position of those bores 47 which receive the pins 46. The pins 46 may be threaded and the bores 47 may be tapped to prevent accidental disconnection of closure member 18 from the receptacle 8. Those bores 47 which are located at a level below the closure member 18 are preferably sealed by suitable plugs 46a one of which is illustrated in FIG. 2. The plugs 46a prevent uncontrolled escape of feed from the receptacle 8 but are optional because, if the feed is granulated or powdered milk, such material is sufficiently viscous to keep it from escaping through passages as small as the bores 47.

Figure 3:
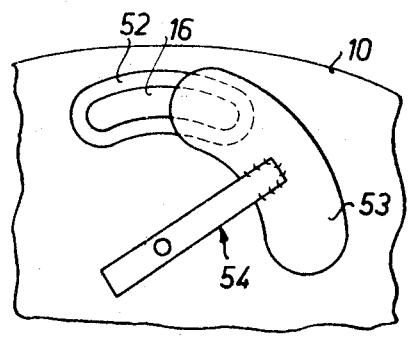
FIG. 3 is a view from below as seen in the direction of arrows from the line III—III of FIG. 2.

FIG. 2 further shows the details of the connection between the output shaft 13 of the motor 11 and the hub 48 of the wheel 12. The top portion 49 of the output shaft 13 forms a stub which extends into a central bore of the hub 48 and is held against rotation with reference to the wheel 12 by one or more keys 51. A screw 50 serves to hold the stub 49 against axial movement with reference to the wheel 12. As stated before, the blades or paddles 15 of the wheel 12 convey flowable material from the cylinder 1 into the annular space 17 when the motor 11 is in operation because the rate at which the opening 16 discharges material into the tank 19 is preferably less than the rate at which the blades 15 cause the material to leave the cylinder 1. When the material rises to the underside of the closure member 18, the cylinder 1 discharges material at the same rate at which such material issues from the receptacle 8 and the pressure in space 17 is then constant. The discharge opening 16 has a larger-diameter lower end portion 52 which can be covered to a desired extent by a shield or mask 53 shown in FIGS. 2 and 3. The feature that the diameter of the opening 16 increases in the direction of material flow is desirable because the opening cannot be clogged with material. The lower end portion 52 is preferably kidney-shaped (see FIG. 3) and the shield 53 is biased against the underside of the bottom wall 10 by a leaf spring 54 which is turnable on a vertical post 55. An adjustable nut 56 meshes with the post 55 and subjects the spring 54 to a desired stress by causing the shield 53 and the free arm 57 of the spring 54 to bear against the underside of the bottom wall 10 with a selected force. FIG. 3 illustrates the spring 54 in an angular position in which it causes the shield 53 to overlie substantially one-half of the opening 16.

Figure 4:
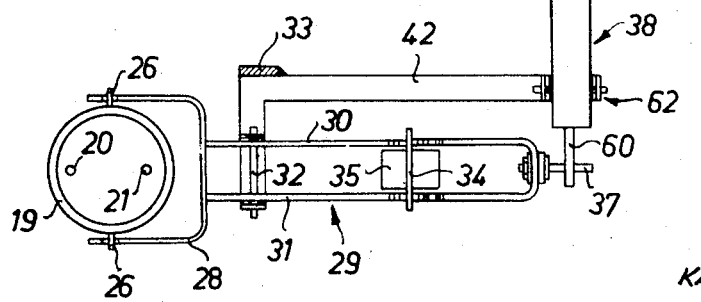
FIG. 4 is a top plan view of a weighing device as seen in the direction of arrows from the line IV—IV in FIG. 1.

FIG. 4 shows the details of the aforementioned bistable switchover device 38. This device comprises a tube 59 one end of which is sealed and carries a motion receiving fork 60 cooperating with the aforementioned post 37 of the balance beam 29 and the other end of which is normally closed by a cap or plug 58. The tube 59 accommodates one or more spherical or roller-shaped weights 61 and is pivotable on a pin 62 carried by the arm 42 of the holder 33. In order to save space, the axes of the pins 32 and 62 preferably make an angle of 90 degrees. This angle can be changed depending on circumstances and may be as large as 180 degrees (see FIG. 5). This latter illustration shows the lower end position of the mixing tank 19 by solid lines and the corresponding end position of the switchover device 38 also by solid lines. The other end positions of the tank 19 and switchover device 38 are indicated by broken lines. When the balance beam 29 assumes the broken-line position of FIG. 5, its trip 36 closes the starter switch 39 so that the tank 19 can receive material from the opening 16 (because the motor 11 drives the wheel 12) and liquid from the pipe 63 (because the valve 41 is open). At the same time, the switch 39 causes the mixer 40 to stir the material in liquid entering the tank 19 and to form a homogeneous dispersion or solution which can be withdrawn by animals sucking the nipples 24, 25. The pipe 63 preferably admits water from a warm water source, not shown. The purpose of the switchover device 38 is to maintain the tank 19 in the broken-line upper end position of FIG. 5 until the tank is filled to a predetermined level and to thereupon effect abrupt movement of tank to the solid-line lower end position. Such abrupt movement of the tank 19 causes the trip 36 of the balance beam 29 to immediately open the switch 39 and to effect immediate stoppage of the motor 11 for the wheel 12 simultaneously with closing of valve 41 and stoppage of the motor in the mixer 40. To bring about the aforementioned abrupt movement of tank 19 from the upper to the lower end position (and vice versa), the tube 59 of the switchover device 38 is only partially filled with spherical or like weights 61. The arrangement is such that a relatively small displacement of the tank 19 from the upper end position of FIG. 5 causes the coupling 37, 60 to move the tube 59 to a horizontal position whereby the weights 61 roll from the cap 58 toward the other end of the tube 59 and compel the fork 60 to move the post 37 to the solid line position of FIG. 5. It is clear that, by changing the position of the fulcrum means 32 and pivot pin 62, by changing the position of the counterweight 35, and by changing the number of weights 61 in the tube 59, the characteristics of the switchover device 38 can be altered at will to render it suitable for use in a given feeding apparatus. The cap 58 allows for convenient and rapid insertion or withdrawal of weights 61.

Figure 6:
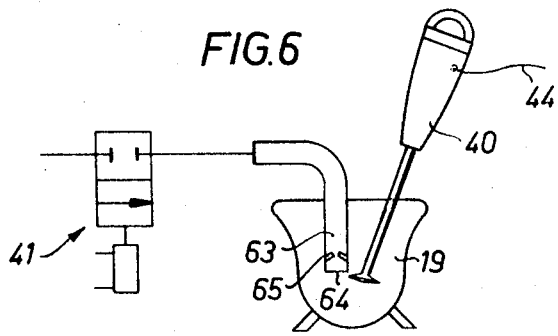
FIG. 6 is a view of a detail of the structure shown in FIG. 1 and further showing a valve which regulates the admission of liquid.

The valve 41 of FIG. 6 is a two-way valve operated by a solenoid which is controlled by the starter switch 39. When the tank 19 assumes its upper end position, the discharge end of the supply pipe 63 extends into its interior as shown in FIG. 6. The lower end of the pipe 63 is closed, as at 64, and this pipe is provided with one or more orifices 65 close to the end 64 to permit outflow of liquid. The liquid enters the tank 19 in the form of one or more directed jets which contributes to thorough mixing of liquid with feed admitted via opening 16 of the receptacle 8. The mixing action is enhanced by the mixer 40.

Figure 7:
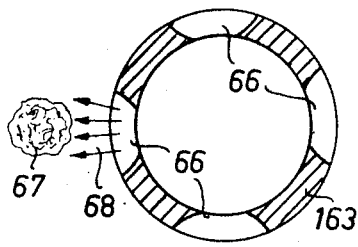
FIG. 7 is an enlarged horizontal sectional view of a modification for use in the structure of FIG. 6.

FIG. 7 illustrates a portion of a modified supply pipe 163. This pipe is formed with four equidistant orifices 66 and its position with reference to the tank 19 is such that one of the orifices 66 directs a jet of liquid against the stream of feed flowing by gravity through the discharge opening 16 of the receptacle 8. Thus, the jet issuing from the left-hand orifice 66 of FIG. 7 impinges against the particles of feed (one particle is shown at 67) even before such particles reach the bottom of the tank 19 or the layer of feed already received in the tank. This contributes to more rapid dissolution or dispersion of feed in the liquid. The orifices 65, 66 are preferably inclined downwardly and outwardly with reference to the closed end of the pipe 63 or 163 to reduce foaming of the dispersion in the tank 19. The arrow 68 indicates in FIG. 7 the direction in which a jet of liquid issues from the corresponding orifice 66 of the supply pipe 163.

The tank 19 may be provided with a single outlet 20 or 21 or with three or more outlets to supply liquefied or liquid-dispersed feed to one, three, four or more nipples. Also, and as stated before, the bottom wall 10 of the receptacle 8 may be provided with two or more discharge openings 16 each of which can deliver feed to a common tank or each of which can deliver feed to a separate tank. Moreover, the housing 6 can accommodate two or more cylinders 1 or like sources and more than one receptacle 8. All such modifications will be readily understood upon perusal of the preceding disclosure of the presently preferred embodiment of my invention.

Since the lower end of the cylinder 1 extends into and is preferably coaxial with the receptacle 8, these parts occupy relatively little room in the housing 6. Moreover, and since the lower end of the cylinder 1 is located above the bottom wall 10, the cylinder can discharge flowable feed by gravity so that the first conveyor screw of the aforementioned conventional apparatus can be dispensed with. Vertical adjustability of the cylinder 1 with reference to the receptacle 8 is desirable to account for different viscosities of materials which can be admitted into the cylinder for transport into the tank 19. Since the agitating wheel 12 is coaxial with the cylinder 1 and receptacle 8, its agitating and conveying action is uniform in all zones of the space 17 above the bottom wall 10. The number and configuration of blades or paddles 15 on the wheel 12 depend on the characteristics of feed in the cylinder 1 and/or on the number of discharge openings in the bottom wall 10. The blades 15 are preferably inclined upwardly and forwardly as considered in the direction of rotation of the wheel 12.

Though the improved apparatus is operative without the bistable switchover device 38, the latter is normally desirable because it insures that the tank 19 leaves its upper end position upon filling with liquid and flowable feed to an accurately determined level and that the tank returns to the upper end position only when the volume of its contents is reduced to a predetermined minimum level. Furthermore, the device 38 prevents uncontrolled opening or closing of the starter switch 39.

The axis of the mixing element 40a of the mixer 40 preferably makes an acute angle with the axis of the tank 19. This insures that the element 40a produces a controlled circulation and brings about thorough intermixing of the contents of the tank 19.

FIG. 1 further shows that the outlets 20, 21 are located at a level at least slightly above the lowermost zone of the tank 19. This allows for settling of contaminants in the bottom zone so that such contaminants (e.g., pieces of paper, pieces of rock or the like) cannot clog the outlets. The tank 19 can be cleaned at regular or irregular intervals.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

I claim:

1. In an animal feeding apparatus, particularly for feeding a solution or dispersion of solid feed in liquid to mammalia, a combination comprising a receptacle arranged to accommodate a supply of flowable feed and provided with at least one discharge opening; metering means operable to discharge feed through said opening; a mixing container positioned to intercept the feed issuing from said receptacle; liquid admitting means operable to admit to said container a liquid; a weighing device supporting said container for movement between predetermined upper and lower positions, said weighing device including a single balance beam having a first arm supporting said container and a second arm, and fulcrum means supporting said beam between said arms thereof; bistable switchover means for effecting movements of said beam between first and second positions respectively corresponding to the upper and lower positions of said container in response to changes in the weight of the contents of said container; and control means cooperating with said beam to operate said liquid admitting means and said metering means in response to movement of said beam to one of said positions thereof.

2. A combination as defined in claim 1, further comprising holder means supporting said fulcrum means, said holder means being carried by said receptacle.

3. A combination as defined in claim 1, wherein said weighing device further comprises counterweight means adjustably suspended on said balance beam intermediate said fulcrum means and said second arm.

4. A combination as defined in claim 3, further comprising knife edge means tiltably supporting said container on said first arm of said balance beam.

5. A combination as defined in claim 1, wherein said metering means comprises a first motor, and further comprising mixer means adapted to stir the contents of said container at least in said upper position, said control means comprising starter means actuatable by said balance beam in response to movement of said container to upper position to start said motor means and said mixer means and to operate said liquid admitting means.

6. A combination as defined in claim 5, wherein said starter means comprises a normally open electric switch and said liquid admitting means comprises a normally closed electromagnetic valve provided in a supply pipe which admits liquid via said valve in response to movement of said container to upper position.

7. A combination as defined in claim 6, further comprising common holder means for said fulcrum means and said switch.

8. A combination as defined in claim 6, wherein said balance beam comprises an actuating member for closing said switch in response to movement of said container to upper position.

9. A combination as defined in claim 8, wherein said actuating means comprises spring means provided on the second arm of said balance beam.

10. A combination as defined in claim 1, wherein said bistable switchover means cooperates with said beam to effect abrupt movements of said container between said positions thereof.

11. A combination as defined in claim 10, wherein said second arm of said balance beam comprises actuating means for said switchover means and the latter comprises motion receiving means cooperating with said actuating means.

12. A combination as defined in claim 11, wherein said switchover means comprises a tubular member turnable about a fixed pivot axis and at least one weight received in and adapted to travel between the ends of said tubular member.

13. A combination as defined in claim 12, wherein said pivot axis is defined by a pivot member supported by the housing of said apparatus.

14. A combination as defined in claim 12, wherein said weight is a sphere and said tubular member comprises a closed and a second end adapted to be opened to permit insertion of additional weights or withdrawal of weights from said tubular member.

15. A combination as defined in claim 12, further comprising holder means supporting said fulcrum means and said tubular member and carried by said receptacle.

16. A combination as defined in claim 1, further comprising mixer means having a mixing element extending into said container when the latter assumes said upper position, said mixing element being inclined with reference to the vertical axis of said container.

17. A combination as defined in claim 1, further comprising a housing for said receptacle and said container, and mixer means arranged to mix the contents of said container in the upper position thereof, said mixer means being provided in and being supported by said housing.

18. A combination as defined in claim 1, wherein said liquid admitting means comprises supply pipe means arranged to admit a liquid into said container in the upper position thereof and valve means provided in said pipe means and arranged to open on movement of said container to upper position, said pipe means having a closed lower end and at least one liquid discharging orifice in the region of said lower end.

19. A combination as defined in claim 18, wherein said orifice is inclined downwardly and outwardly with reference to the closed end of said pipe means.

20. A combination as defined in claim 1, wherein said container has a lowermost zone and at least one outlet for evacuation of its contents, said outlet being provided at a level above said lowermost zone of the container.